United States Patent
Angelis et al.

(10) Patent No.: US 8,803,372 B2
(45) Date of Patent: Aug. 12, 2014

(54) IRONLESS MAGNETIC LINEAR MOTORS HAVING LEVITATING AND TRANSVERSAL FORCE CAPACITIES

(75) Inventors: Georgo Angelis, Oss (NL); David Biloen, Rotterdam (NL)

(73) Assignee: Koninklijke Philips N.V., Eindhoven (NL)

( * ) Notice: Subject to any disclaimer, the term of this patent is extended or adjusted under 35 U.S.C. 154(b) by 290 days.

(21) Appl. No.: 12/064,967

(22) PCT Filed: Aug. 10, 2006

(86) PCT No.: PCT/IB2006/052772
§ 371 (c)(1),
(2), (4) Date: Feb. 27, 2008

(87) PCT Pub. No.: WO2007/026270
PCT Pub. Date: Mar. 8, 2007

(65) Prior Publication Data
US 2008/0246348 A1    Oct. 9, 2008

Related U.S. Application Data

(60) Provisional application No. 60/712,233, filed on Aug. 29, 2005.

(51) Int. Cl.
*H02K 41/02* (2006.01)
(52) U.S. Cl.
USPC .................. 310/12.22; 310/12.01; 310/12.21; 310/12.24
(58) Field of Classification Search
CPC ..... H02K 41/0356; H02K 3/47; H02K 11/00; H02K 16/02
USPC .............. 310/12.09, 12.25, 90, 12.01, 12.22, 310/90.5; 318/38, 115, 135, 653
IPC ................................ H02K 41/00,41/02, 41/03
See application file for complete search history.

(56) References Cited

U.S. PATENT DOCUMENTS 3,771,033 A * 11/1973 Matsui et al. ................. 104/282
4,151,447 A *  4/1979 von der Heide et al. ...... 318/135
(Continued)

FOREIGN PATENT DOCUMENTS

GB            1441818       7/1976
JP          09252570 A      9/1997
(Continued)

OTHER PUBLICATIONS

Fink et al , Standard Handbook for Electrical Engineers, 1993, McGraw-Hill, 13th Ed., pp. 2-41.*

(Continued)

*Primary Examiner* — John K Kim

(57) ABSTRACT

An ironless magnetic motor includes a magnetic track and a forcer. The forcer is oriented in a magnetic field across a linear air gap of the magnetic track to generate a drive force parallel to the X drive axis and orthogonal to the Z levitation axis in response to a commutation drive current and to generate a force orthogonal to the X drive axis in response to a commutation coil current being superimposed on and phase shifted from the commutation drive current. To this end, a set of levitating turns of the coil parallel to the X drive axis and orthogonal to the Z levitation axis may be internal or external to magnetic field, and the forcer may be centered or offset from a center X-Z longitudinal axis (CP) of the linear air gap.

6 Claims, 15 Drawing Sheets

(56) References Cited

U.S. PATENT DOCUMENTS

| | | | |
|---|---|---|---|
| 5,666,038 A * | 9/1997 | Ohishi | 318/625 |
| 5,789,837 A * | 8/1998 | Shin et al. | 310/90.5 |
| 6,101,952 A * | 8/2000 | Thornton et al. | 104/282 |
| 6,252,314 B1 | 6/2001 | Ebinuma | |
| 6,405,659 B1 | 6/2002 | Hazelton | |
| 6,429,611 B1 * | 8/2002 | Li | 318/115 |
| 6,864,601 B2 * | 3/2005 | Sogard | 310/12.25 |
| 7,211,908 B2 * | 5/2007 | Tamaki | 310/12.25 |
| 7,425,783 B2 * | 9/2008 | Sakiya | 310/12.22 |
| 2002/0089237 A1 * | 7/2002 | Hazelton | 310/12 |
| 2002/0153790 A1 | 10/2002 | Kanebako et al. | |
| 2003/0132672 A1 * | 7/2003 | Watanabe | 310/12 |
| 2004/0070285 A1 * | 4/2004 | Sogard | 310/12 |
| 2004/0239911 A1 | 12/2004 | Carter et al. | |
| 2005/0040712 A1 | 2/2005 | Hazelton | |
| 2005/0067986 A1 * | 3/2005 | Kurosawa et al. | 318/254 |
| 2005/0077793 A1 | 4/2005 | Garvey et al. | |
| 2005/0088135 A1 * | 4/2005 | Sato | 318/717 |
| 2005/0168086 A1 * | 8/2005 | Tamaki | 310/90.5 |
| 2005/0286779 A1 | 12/2005 | Sasaki et al. | |
| 2007/0035184 A1 * | 2/2007 | Sakiya | 310/12 |
| 2008/0246348 A1 * | 10/2008 | Angelis et al. | 310/12 |

FOREIGN PATENT DOCUMENTS

| | | |
|---|---|---|
| JP | 2004135468 A | 4/2004 |
| JP | 2004187401 A | 7/2004 |

OTHER PUBLICATIONS

Hayt et al, "Engineering Circuit Analysis", 1986, McGraw Hill, pp. 76 and 267.*
Papoulis, "Circuit and Systems",1980, Holt Saunders, p. 70.*
Valkenburg, "Network Analysis", 1974, Prentice Hall, p. 256.*
Wikipedia, 'superposition principle', www.wikipedia.org.*
van Lubek, Dirk-Jan, "Demonstrator of a o-z Motor", Master of Science Thesis, Jul. 2000, CTB593-00-4133, pp. 1-80.
http://web.mit.edu/pmc/www/Projects/Planar/planar.html, "High Precision Planar Magnetic Levitation", Jun. 20, 2005, pp. 1-2.

* cited by examiner

IRONLESS MAGNETIC LINEAR MOTORS HAVING LEVITATING AND TRANSVERSAL FORCE CAPACITIES

CROSS REFERENCE TO RELATED APPLICATIONS

This application claims the benefit of international Application Number PCT/IB2006/052772, filed Aug. 10, 2006, and U.S. Provisional Application Ser. No. 60/712,233 filed Aug. 29, 2005 which are incorporated herein in whole by reference.

The present invention generally relates to ironless magnetic linear motors. The present invention specifically relates to generating two or more controllable orthogonal forces in a ironless magnetic linear motor.

FIGS. 1-4 illustrate an ironless magnetic linear motor 20 employing a magnetic track 30 and a forcer 40. Magnetic track 30 includes a linear magnetic array 31 and a linear magnetic array 32 for generating a magnetic field β across a linear air gap as best shown in FIG. 3. Linear magnetic arrays 31 and 32 have 180° degree spatial separation between adjacent magnets.

Forcer 40 is disposed within the linear air gap along a center X-Z longitudinal plane CP of the linear air gap as best shown in FIG. 2, and includes three (3) coils 41-43 with a 120°+n*360 degree spatial separation (n is an arbitrary integer) between adjacent coils. As shown in FIG. 4, coil 41 is represented by its flow path for a commutation drive current $I_{X1}$, coil 42 is represented by its flow path for a commutation drive current $I_{X2}$ and coil 43 is represented by its flow path for a commutation drive current $I_{X3}$.

Opposing sets of drive turns of coils 41-43 orthogonal to a X drive axis of linear air gap and parallel to a Z levitation axis of linear air gap are internal to magnetic field β as best shown in FIGS. 2 and 4. Opposing sets of levitating turns of coils 41-43 parallel to the X drive axis and orthogonal to the Z levitation axis are external to magnetic field β as best shown in FIG. As a result, an application of a 120° phase shift PS1 of commutation drive currents $I_{X1}$, $I_{X2}$ and $I_{X3}$ to coils 41-43, respectively, exclusively generates a drive force $F_X$ parallel to the X drive axis as best shown in FIG. 5.

A drawback of the structural configuration of ironless magnetic linear motor 20 is its inability to generate a substantially independent levitating force $F_Z$ parallel to the Z levitation axis as best shown in FIG. 5 and its inability to generate a substantially independent transversal force $F_Y$ parallel to the Y transversal axis of the linear air gap as best shown in FIG. 5. To overcome these drawbacks, the present invention provides a new and improved ironless magnetic linear motor implementing a new orientation of forcer 40 within the linear air gap of magnetic track 30 to thereby facilitate a superimposition of a commutation levitation current $I_Z$ and/or a commutation transversal current $I_Y$ on the commutation drive current $I_X$ for each coil of forcer 40.

In a first form of the present invention, one set of levitating turns of a coil parallel to the X drive axis and orthogonal to the Z levitation axis is internal to magnetic field, and an opposing set of levitating turns of a coil parallel to the X drive axis and orthogonal to the Z levitation axis is external to magnetic field. A commutation drive current is applied to the coil to generate a drive force parallel to the X drive axis and orthogonal to the Z levitation axis. A commutation levitating current is superimposed on and phase shifted from the commutation drive current to generate a levitating force orthogonal to the X drive axis and parallel to the Z levitation axis.

In a second form of the present invention, a coil of the forcer is offset from a center X-Z longitudinal plane of the linear air gap. A commutation drive current is applied to the coil to generate a drive force parallel to the X drive axis and orthogonal to the Y transversal axis. A commutation transversal current is superimposed on and phase shifted from the commutation drive current to generate a transversal force orthogonal to the X drive axis and parallel to the Y transversal axis.

In a third form of the present invention, a commutation drive current is applied to a coil of the forcer to generate a drive force parallel to the X drive axis. The forcer is orientated with the linear air gap to generate a force orthogonal to the X drive axis in response to an additional commutation coil current being superimposed on and phase shifted from the commutation drive current.

The foregoing forms and other forms of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

Figure 6:
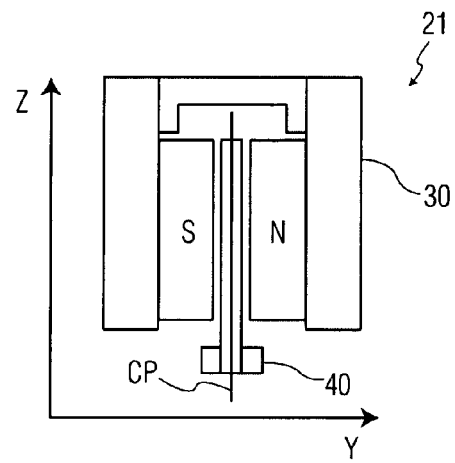
FIG. 6 illustrates a view of an ironless magnetic linear motor in a Y-Z plane in accordance with a first embodiment of the present invention.
Figure 7:
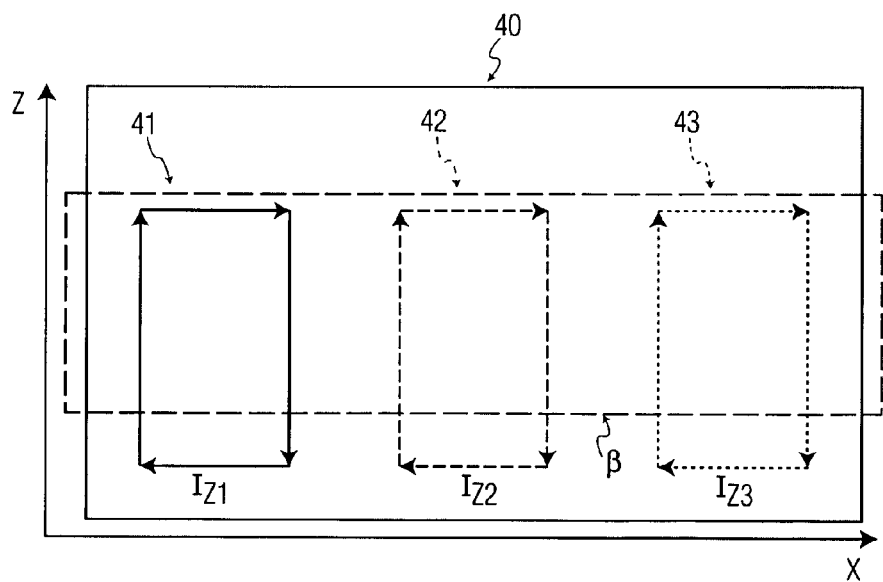
FIG. 7 illustrates a view of an application of commutation levitating currents to a forcer of FIG. 6 in a X-Z plane in accordance with the present invention.

Referring to FIG. 6, an ironless magnetic linear motor 21 of the present invention employing magnetic track 30 and forcer 40 with forcer 40 having a new and unique orientation within the linear air gap. Specifically, forcer 40 is disposed within the linear air gap along a center X-Z longitudinal plane CP of the linear air gap as best shown in FIG. 6. As shown in FIG. 7, coil 41 of forcer 40 is represented by its flow path for a commutation levitating current $I_{Z1}$, coil 42 is of forcer 40 is represented by its flow path for a commutation levitating current $I_{Z2}$, coil 43 of forcer 40 is represented by its flow path for a commutation levitating current $I_{Z3}$.

Figure 8:
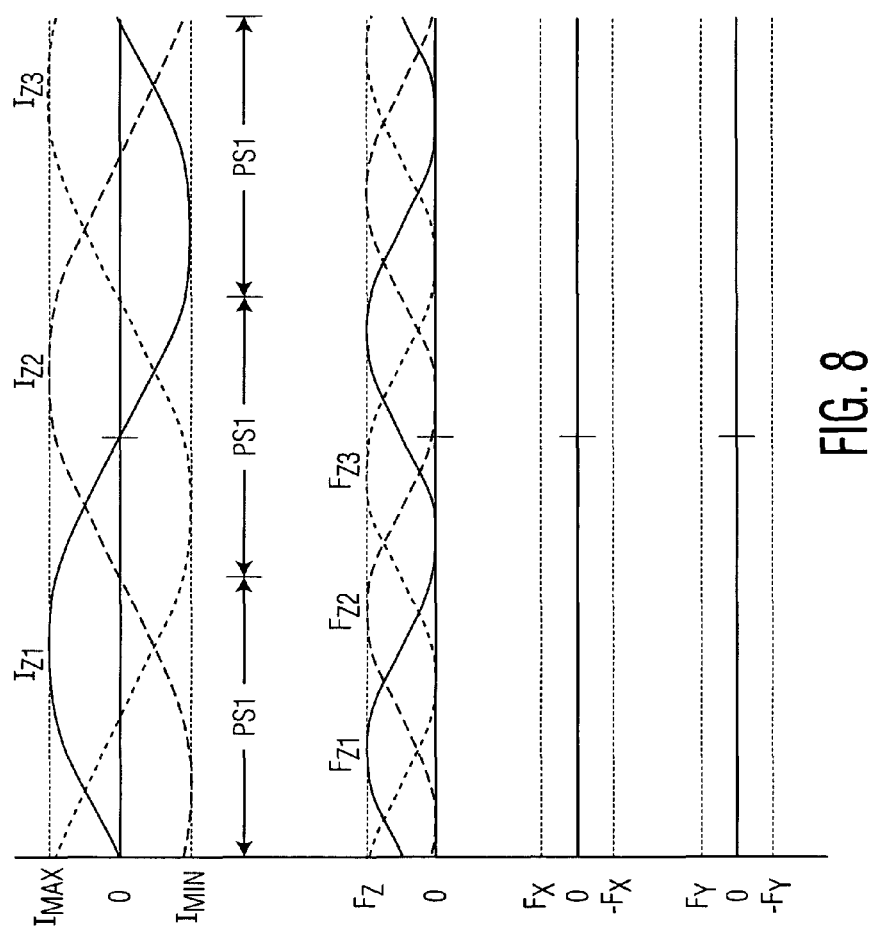
FIG. 8 illustrates exemplary commutation levitating currents applied to the forcer of FIG. 7 and an exemplar levitation force generated by the forcer in response to the commutation levitating currents in accordance with the present invention.

Opposing sets of drive turns of coils 41-43 orthogonal to the X drive axis and parallel to the Z levitation axis are internal to magnetic field β as best shown in FIG. 7. One set of levitating turns of coils 41-43 parallel to the X drive axis and orthogonal to the Z levitation axis from a bottom perspective of FIG. 7 is external to magnetic field β, while the opposing set of levitating turns of coils 41-43 parallel to the X drive axis and orthogonal to the Z levitation axis from a top perspective of FIG. 7 is internal to magnetic field β. As a result, an application of a 120° phase shift PS1 of commutation levitating currents $I_{Z1}$, $I_{Z2}$ and $I_{Z3}$ to coils 41-43, respectively, generates a levitating force $F_Z$ parallel to the Z levitating axis as best shown in FIG. 8.

Figure 9:
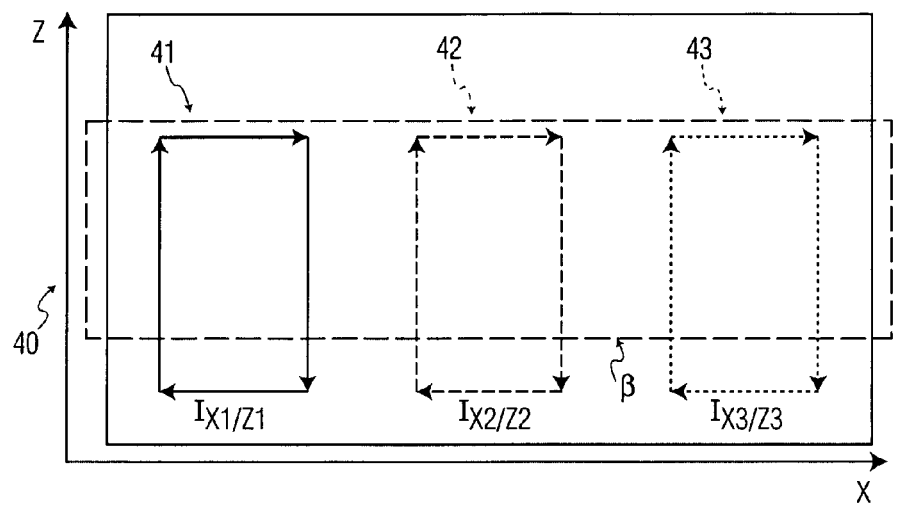
FIG. 9 illustrates a view of an application of superimposed commutation drive currents and commutation levitating currents to the forcer of FIG. 7 in a X-Z plane in accordance with the present invention.
Figure 10:
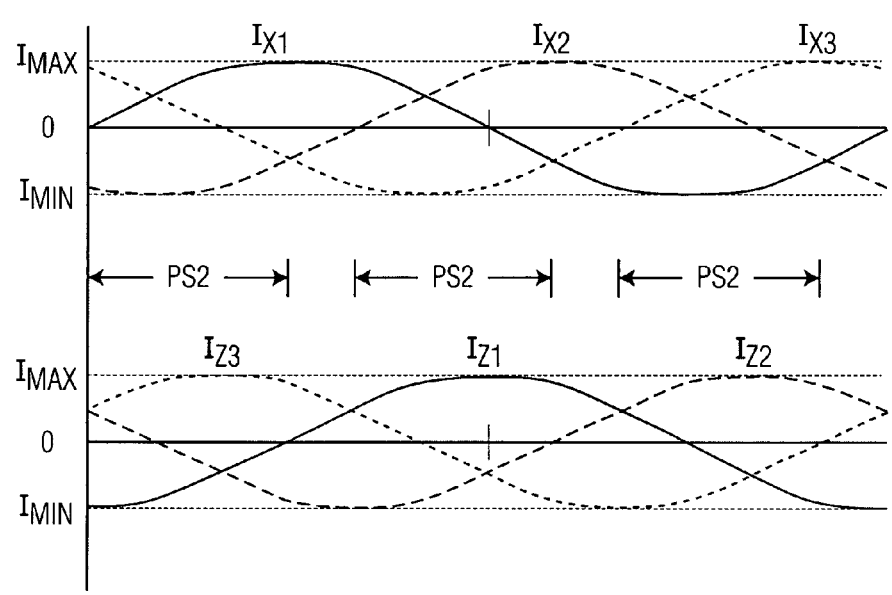
FIG. 10 illustrates exemplary phase shifting of commutation drive currents and commutation levitating currents as applied to the forcer of FIG. 9 in accordance with the present invention.
Figure 11:
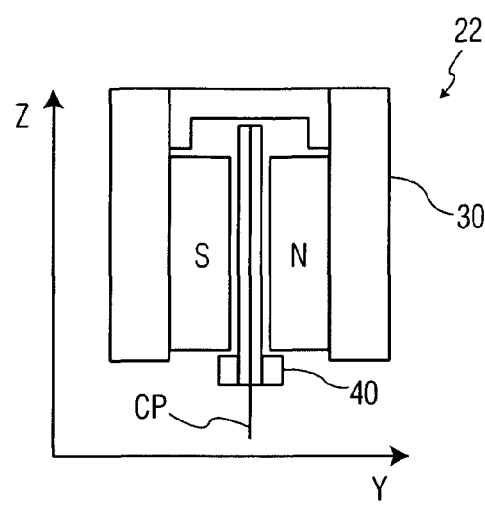
FIG. 11 illustrates a view of an ironless magnetic linear motor in a Y-Z plane in accordance with a second embodiment of the present invention.

The present invention provides for a phase shifting of a superimposition of commutation levitating currents $I_{Z1}$, $I_{Z2}$ and $I_{Z3}$ on commutation drive currents $I_{X1}$, $I_{X2}$ and $I_{X3}$, respectively. Specifically, as shown in FIG. 9, coil 41 of forcer 40 is represented by its flow path for a superimposition of commutation levitating current $I_{Z1}$ on commutation drive coil $I_{X1}$, coil 42 of forcer 40 is represented by its flow path for a superimposition of commutation levitating current $I_{Z2}$ on commutation drive coil $I_{X2}$, and coil 43 of forcer 40 is represented by its flow path for a superimposition of commutation levitating current $I_{Z3}$ on commutation drive coil $I_{X3}$. As shown in FIG. 10, commutation levitating current $I_{Z1}$ is phase shifted from commutation drive coil $I_{X1}$ by a 90° phase shift PS2, commutation levitating current $I_{Z2}$ is phase shifted from commutation drive coil $I_{X2}$ by 90° phase shift PS2, and commutation levitating current $I_{Z3}$ is phase shifted from commutation drive coil $I_{X3}$ by 90° phase shift PS2.

Figure 1:
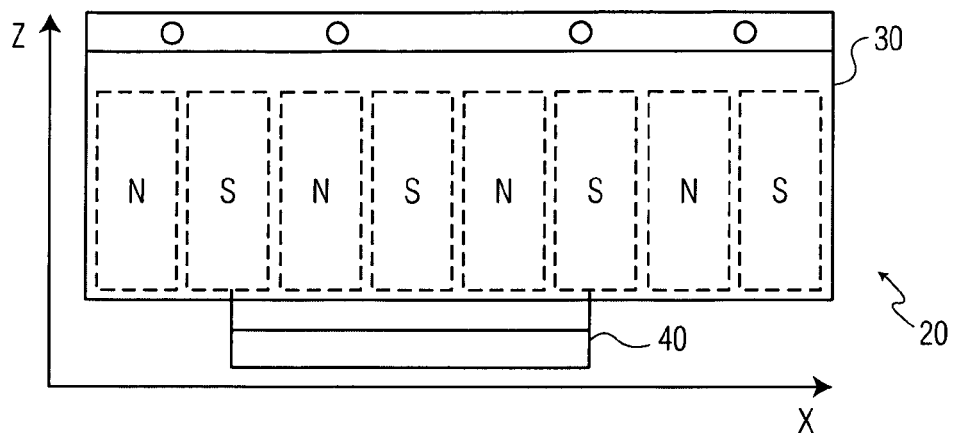
FIG. 1 illustrates a view of an ironless magnetic linear motor in a X-Z plane as known in the art.
Figure 2:
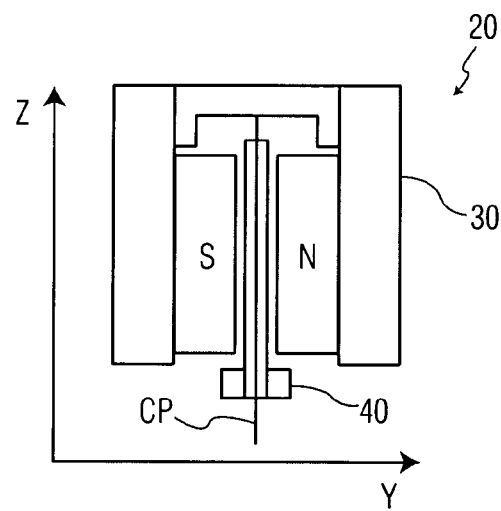
FIG. 2 illustrates a view of the ironless magnetic linear motor of FIG. 1 in a Y-Z plane.
Figure 3:
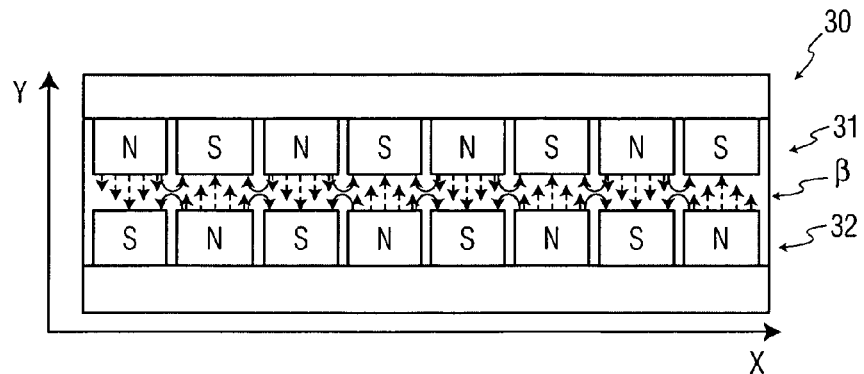
FIG. 3 illustrates a view of a linear air gap of a magnetic track of FIG. 1 in a X-Y plane.
Figure 4:
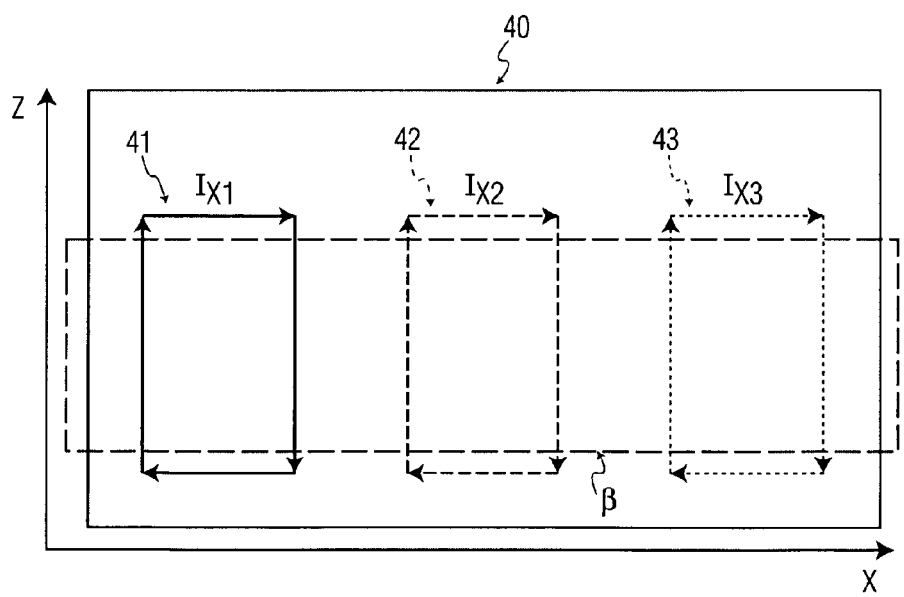
FIG. 4 illustrates a view of an application of commutation drive currents to coils of a forcer of FIG. 1 in a X-Z plane.
Figure 5:
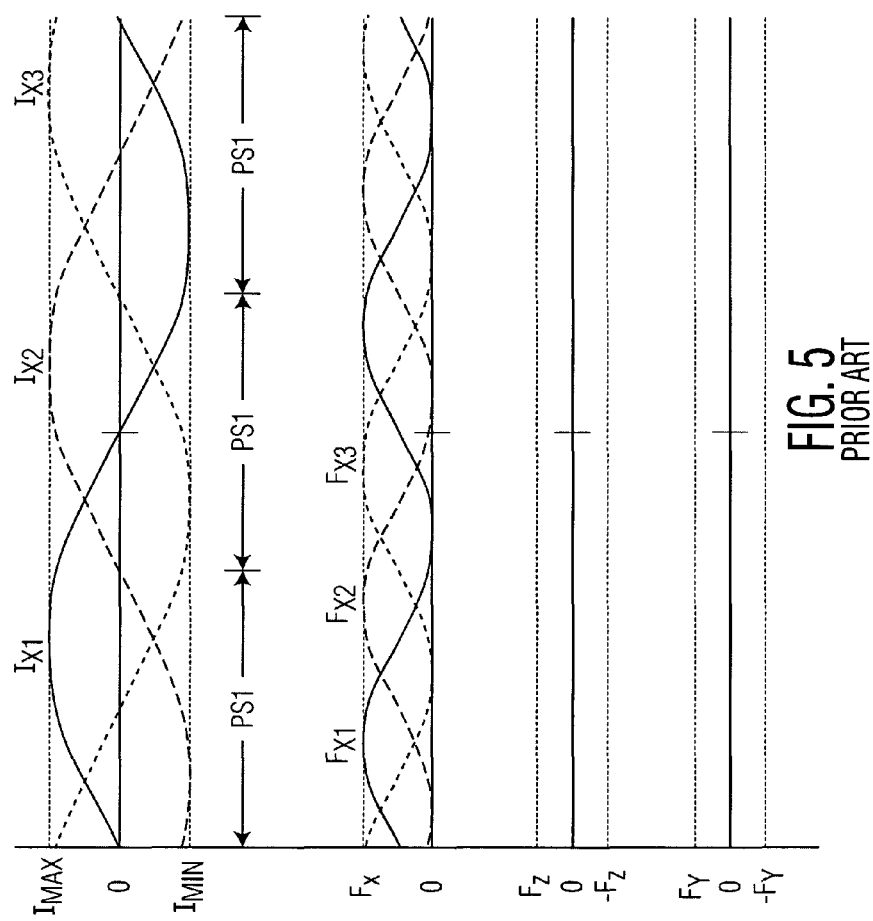
FIG. 5 illustrates exemplary commutation drive currents applied to a forcer of FIG. 1 and an exemplary drive force generated by the forcer in response to the commutation drive currents as known in the art.
Figure 12:
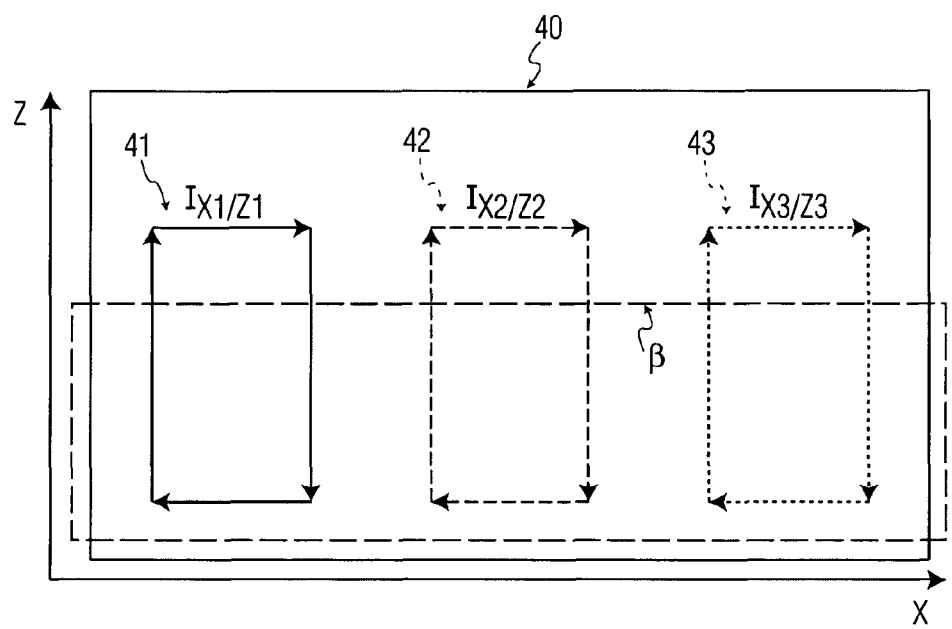
FIG. 12 illustrates a view of an application of superimposed commutation drive currents and commutation levitating currents to a forcer of FIG. 11 in a X-Z plane in accordance with the present invention.

Referring to FIG. 1, an ironless magnetic linear motor 22 of the present invention employing magnetic track 30 and forcer 40 with forcer 40 having a opposite orientation within the linear air gap as compared to the forcer 40 orientation of the linear air gap of motor 21 (FIG. 6). Specifically, opposing sets of drive turns of coils 41-43 orthogonal to the X drive axis and parallel to the Z levitation axis are internal to magnetic field β as best shown in FIG. 12. One set of levitating turns of coils 41-43 parallel to the X drive axis and orthogonal to the Z levitation axis from a top perspective of FIG. 12 is external to magnetic field β, while the opposing set of levitating turns of coils 41-43 parallel to the X drive axis and orthogonal to the Z levitation axis from a bottom perspective of FIG. 12 is internal to magnetic field β. As a result, an application of a 120° phase shift PS1 of commutation levitating currents $I_{Z1}$, $I_{Z2}$ and $I_{Z3}$ to coils 41-43, respectively, generates a levitating force $F_Z$ parallel to the Z levitating axis as best shown in FIG. 8.

The present invention provides for a phase shifting of a superimposition of commutation levitating currents $I_{Z1}$, $I_{Z2}$ and $I_{Z3}$ on commutation drive currents $I_{X1}$, $I_{X2}$ and $I_{X3}$, respectively. Specifically, as shown in FIG. 12, coil 41 of forcer 40 is represented by its flow path for a superimposition of commutation levitating current $I_{Z1}$ on commutation drive coil $I_{X1}$, coil 42 of forcer 40 is represented by its flow path for a superimposition of commutation levitating current commutation drive coil $I_{X2}$, and coil 43 of forcer 40 is represented by its flow path for a superimposition of commutation levitating current $I_{Z1}$ on commutation drive coil $I_{X3}$. As shown in FIG. 10, commutation levitating current $I_{Z1}$ is phase shifted from commutation drive coil $I_{X1}$ by a 90° phase shift PS2, commutation levitating current $I_{Z2}$ is phase shifted from commutation drive coil $I_{X2}$ by 90° phase shift PS2, and commutation levitating current $I_{Z3}$ phase shifted from commutation drive coil $I_{X3}$ by 90° phase shift PS2.

Figure 13:
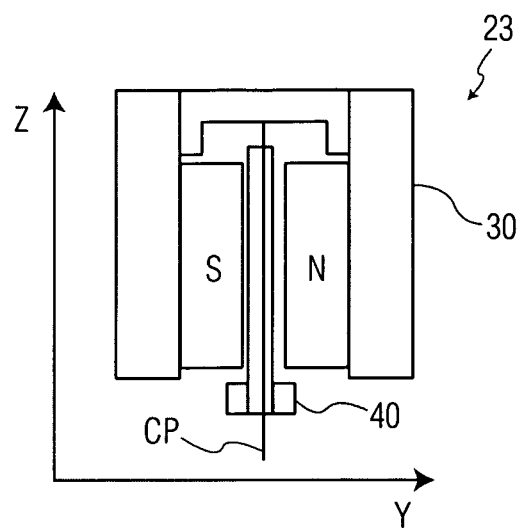
FIGS. 13 and 14 illustrate views of an ironless magnetic linear motor in a Y-Z plane in accordance with a third embodiment of the present invention.
Figure 14:
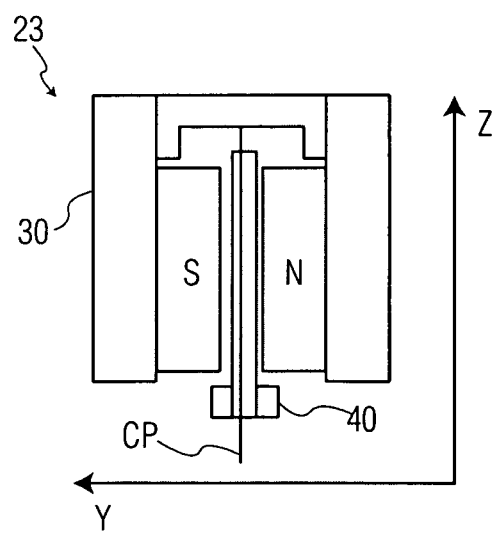
Figure 15:
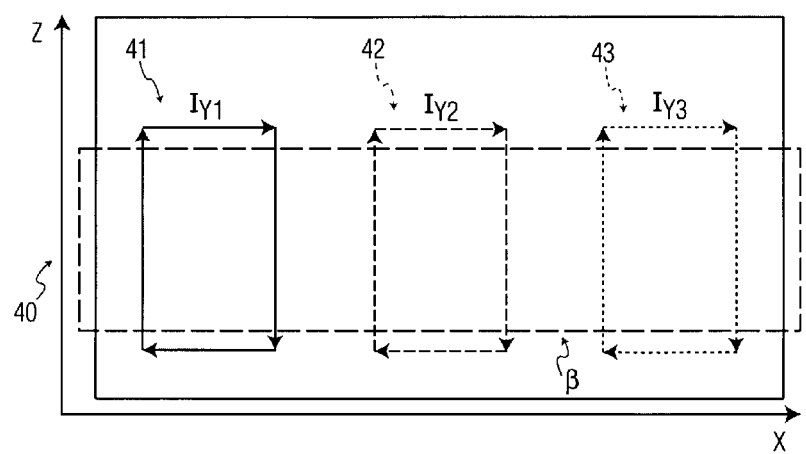
FIG. 15 illustrates a view of an application of commutation transversal currents to a forcer of FIGS. 13 and 14 in a X-Z plane in accordance with the present invention.

Referring to FIGS. 13-15, an ironless magnetic linear motor 23 of the present invention employing magnetic track 30 and forcer 40 with forcer 40 having a new and unique orientation within the linear air gap. Specifically, forcer 40 is disposed within the linear air gap at an offset to center X-Z longitudinal plane CP of the linear air gap as best shown in FIGS. 13 and 14. As shown in FIG. 15, coil 41 of forcer 40 is represented by its flow path for a commutation levitating current $I_{Y1}$, coil 42 is of forcer 40 is represented by its flow path for a commutation levitating current $I_{Y2}$, coil 43 of forcer 40 is represented by its flow path for a commutation levitating current $I_{Y3}$.

Figure 16:
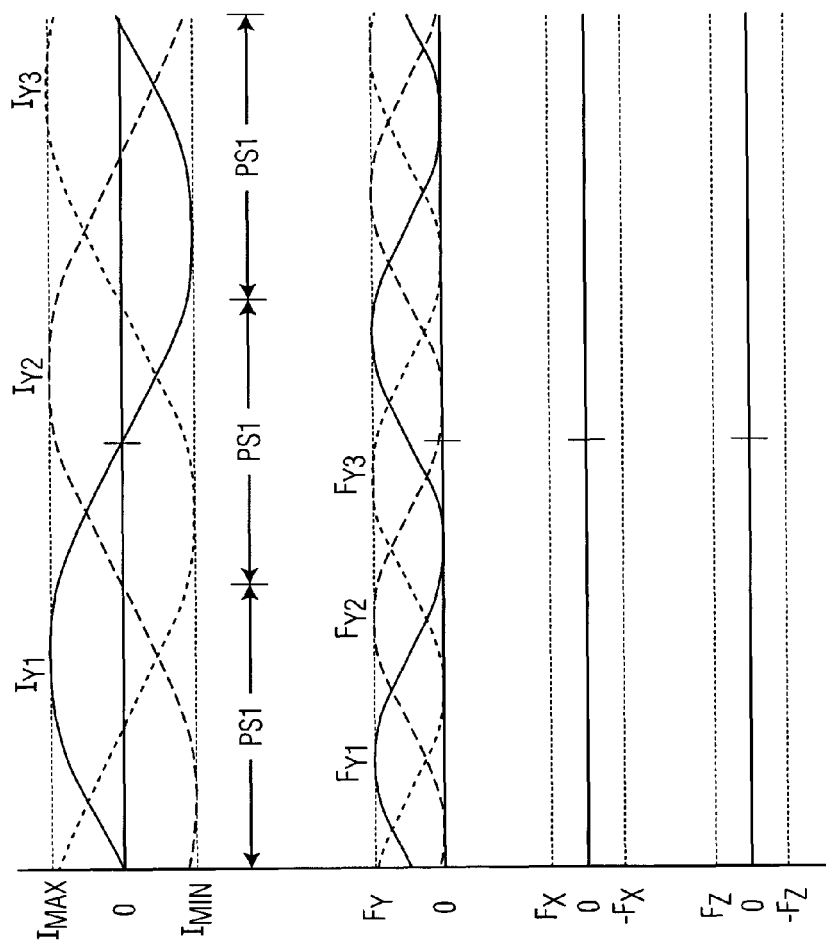
FIG. 16 illustrates exemplary commutation transversal currents applied to a forcer of FIG. 15 and an exemplary transversal force generated by the forcer in response to the commutation transversal currents in accordance with the present invention.

Opposing sets of drive turns of coils 41-43 orthogonal to the X drive axis and parallel to the Z levitation axis are internal to magnetic field β as best shown in FIG. 15. Opposing sets of levitating turns of coils 41-43 parallel to the X drive axis and orthogonal to the Z levitation axis are external to magnetic field β as best shown in FIG. 15. As a result, an application of a 120° phase shift PS1 of commutation transversal currents $I_{Y1}$, $I_{Y2}$ and $I_{Y3}$ to coils 41-43, respectively, generates a transversal force $F_Y$ parallel to the Y transversal axis as best shown in FIG. 16.

Figure 17:
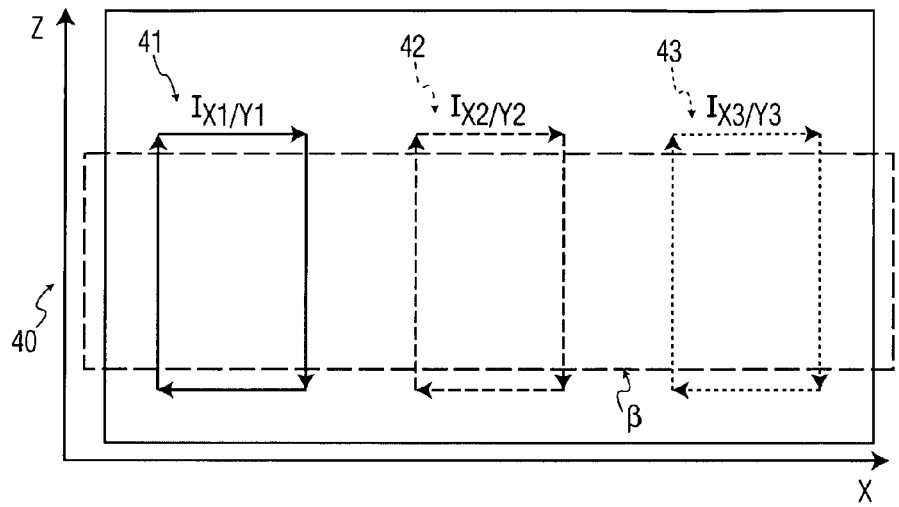
FIG. 17 illustrates a view of an application of superimposed commutation drive currents and commutation transversal currents to the forcer of FIG. 2 in a X-Z plane in accordance with the present invention.
Figure 18:
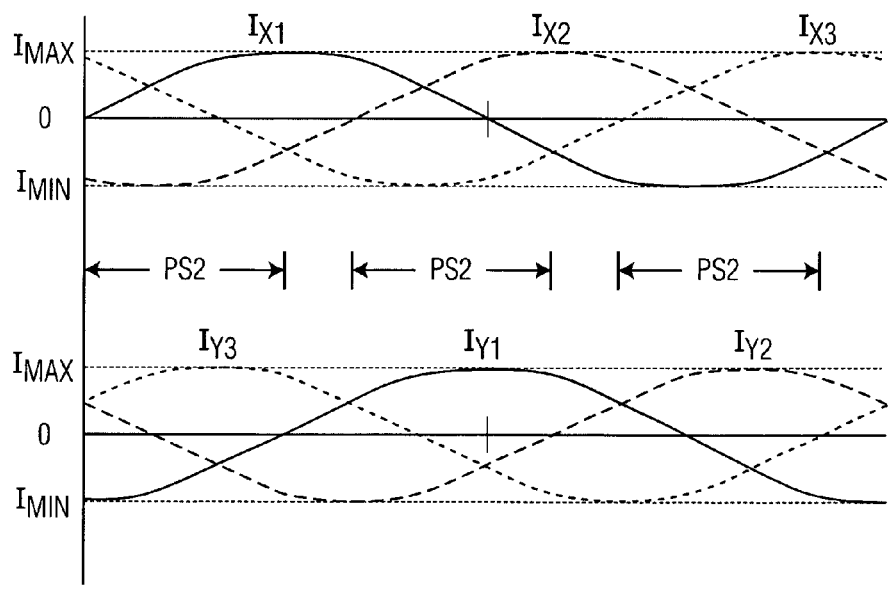
FIG. 18 illustrates exemplary phase shifting of commutation drive currents and commutation transversal currents as applied to the forcer of FIG. 17.

The present invention provides for a phase shifting of a superimposition of commutation transversal currents $I_{Y1}$, $I_{Y2}$ and $I_{Y3}$ on commutation drive currents $I_{X1}$, $I_{X2}$ and $I_{X3}$, respectively. Specifically, as shown in FIG. 17, coil 41 of forcer 40 is represented by its flow path for a superimposition of commutation transversal current $I_{y1}$ on commutation drive coil $I_{x1}$, coil 42 of forcer 40 is represented by its flow path for a superimposition of commutation transversal current $I_{y2}$ on commutation drive coil $I_{x2}$, and coil 43 of forcer 40 is represented by its flow path for a superimposition of commutation transversal current $I_{y3}$ on commutation drive coil $I_{x3}$. As shown in FIG. 18, commutation transversal current $I_{y1}$ is phase shifted from commutation drive coil $I_{x1}$ by a 90° phase shift PS2, commutation transversal current $I_{y2}$ is phase shifted from commutation drive coil $I_{x2}$ by 90° phase shift PS2, and commutation transversal current $I_{y3}$ is has shifted from commutation drive coil $I_{x3}$ by 90° phase shift PS2.

Figure 19:
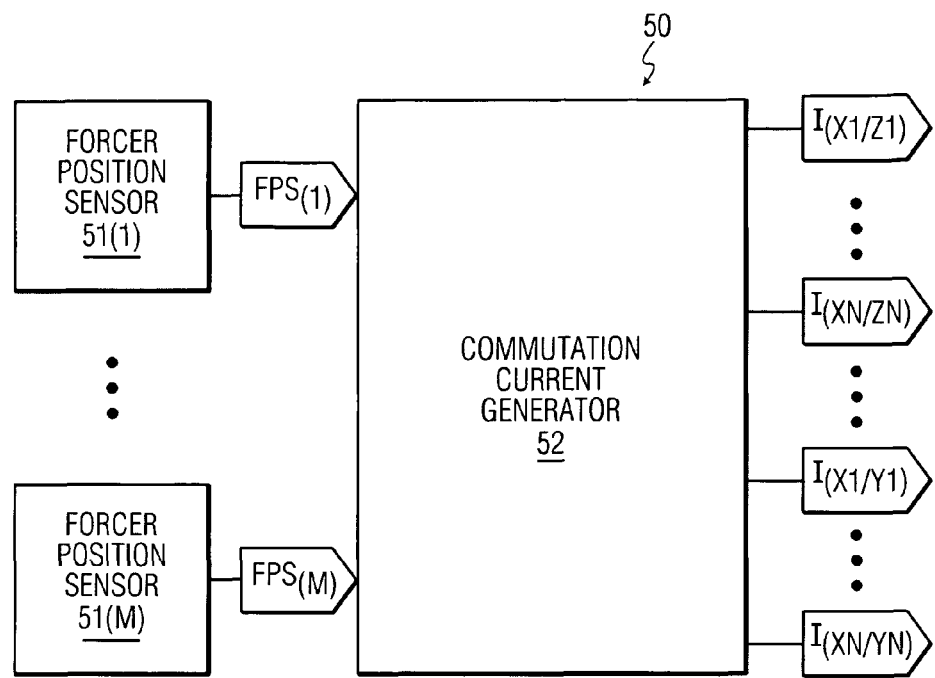
FIG. 19 illustrates a commutation current superimposition/phase shifting control system in accordance with a fourth embodiment of the present invention.

In practice, the present invention does not impose any limitations or any restrictions as a system for controlling a ironless magnetic linear motor of the present invention. In one embodiment as illustrated in FIG. 19, a commutation current superimposition/phase shifting control system 50 of the present invention employing M number of forcer position sensors 51, where M≥1, and a commutation current generator 52. Sensor(s) 51 operate to measure the relative position (up to 360 spatial degrees) of coils of a forcer within the magnetic field generated by the linear arrays of magnets within the linear air gap of the magnetic track. In one embodiment, sensor(s) 51 are position transducers strategically positioned relative to the forcer to thereby provide signals FPS indicative of a position of coils of a forcer within the magnetic field in view of the structural configurations of the magnetic track and the force. In a second embodiment, sensor(s) 51 are magnetic flux sensors (e.g., Hall sensors) strategically positioned relative to the forcer within the magnetic field to thereby provide signals FPS indicative of a position of coils of a forcer within the magnetic field in view of the structural configurations of the magnetic track and the forcer.

Commutation current generator 52 operates to provide a phase shifting of a N number of superimposition of commutation levitating currents $I_Z$ on respective commutation drive currents $I_X$ and/or a phase shifting of a N number of superimposition of commutation transversals currents $I_Y$ on respective commutation drive currents $I_X$ as shown in FIG. 19. This operation of generator 52 is in accordance with new and unique superimposition/phase shifting commutation algorithm designed in view of the structural configurations and relative orientations of the magnetic track, the forcer and sensors 51.

Referring to FIGS. 6-19, those having ordinary skill in the art will appreciate numerous advantages of the present invention including, but not limited to, addressing the drawbacks of the background art previously described herein. Furthermore, those having ordinary skill in the art will appreciate how to apply the phase shifting/superimposition inventive principles of the present invention to ironless magnetic liner motors in addition to motors 21-23 shown in FIGS. 6, 11, 13 and 14, respectively. In particular, those having ordinary skill in the art will appreciate how to apply the phase shifting/superimposition inventive principles of the present invention in the context of (1) the numerous variations in a structural configuration of a magnetic track, (2) the numerous variations in a structural configuration of a forcer, (3) the numerous variations in the orientation of a forcer in a linear air gap of a magnetic track in accordance with the present invention, (4) the numerous variations in a structural configuration of forcer position sensors, (5) the phase shifting range for commutation coil currents of the same type, (6) the phase shifting range for commutation coil currents of a dissimilar types and (7) the implementation of a positive slope and/or a negative slope for the commutation coil currents. The result is numerous variations of combinations of ironless magnetic linear motors in accordance with the inventive principles of the present invention, such as, for example, the utilization of one ore more magnetic tracks to build a more degree of freedom (position and/or orientation) stage/manipulator as will now be exemplary described herein in the context of FIGS. 20-24.

Figure 20:
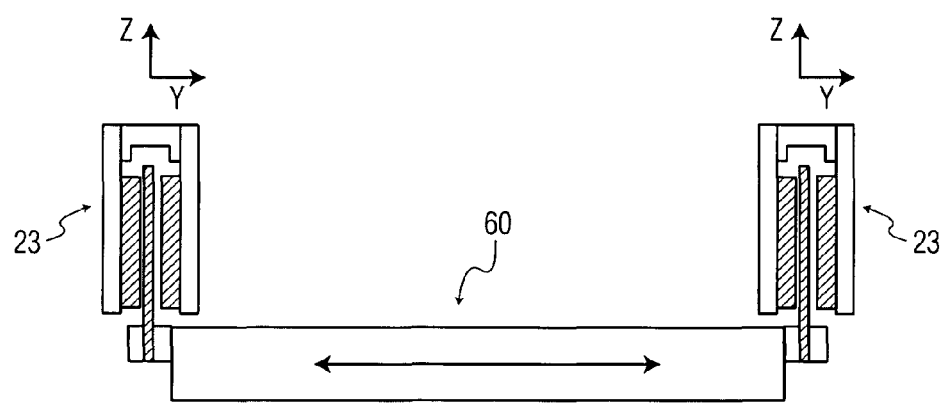
FIG. 20 illustrates a first exemplary mechanical coupling of a pair of ironless magnetic linear motor of the present invention to an object.

Referring to FIG. 20, a pair of ironless magnetic linear motors 23 (FIGS. 13-15) are mechanically coupled in an eccentric to opposing sides of an object 60 whereby motors 23 can be operated to selectively move object 60 in an X drive direction of their respective linear air gaps and in a Y transversal direction of their respective linear air gaps.

Figure 21:
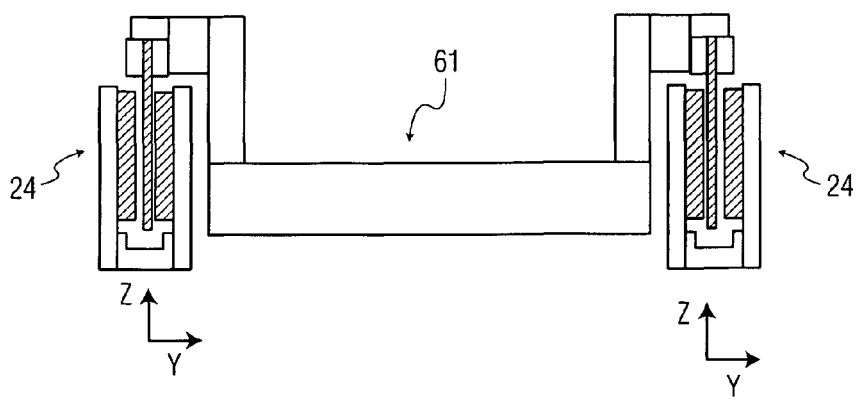
FIG. 21 illustrates a second exemplary mechanical coupling a pair of ironless magnetic linear motor of the present invention to an object.
Figure 22:
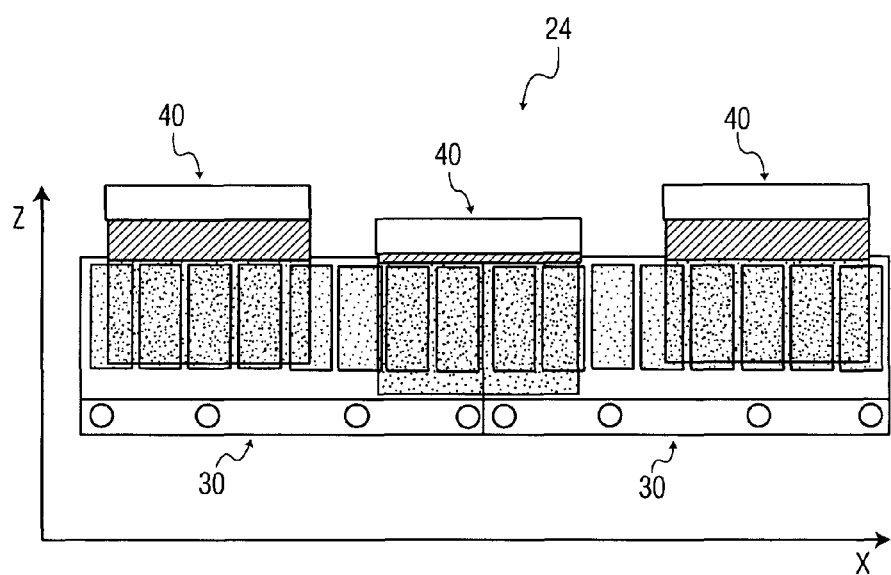
FIG. 22 illustrates a view of an ironless magnetic linear motor of FIG. 21 in a X-Z plane.

Referring to FIGS. 21 and 22, a pair of ironless magnetic linear motors 24 is mechanically coupled in an eccentric to opposing sides of an object 61. Each motor 24 includes a pair of magnetic tracks 30 mechanically coupled to align their respective linear air gaps as an integrated linear air gap. Each motor 24 further includes pair of outside forcers 40(O) within the integrated linear air gap to selectively generate a drive force $F_X$, a levitation force $F_Z$, a drive torque $R_X$, a levitating torque $R_Y$ and a transversal torque $R_Z$. Each motor 24 further includes an internal forcer 40(I) within the integrated linear air gap to selectively generate a drive force $F_X$, a transversal force $F_Y$, and levitating torque $R_Z$. The result is a six (6) degree of freedom control of object 61 relative to a coordinate system of object 61 with a long stroke of object 61 along the X drive axis of the integrated linear air gaps of motors 24 and short strokes of object 61 along the Z levitating axes and the Y transversal axes of the integrated linear air gaps of motors 24.

Figure 23:
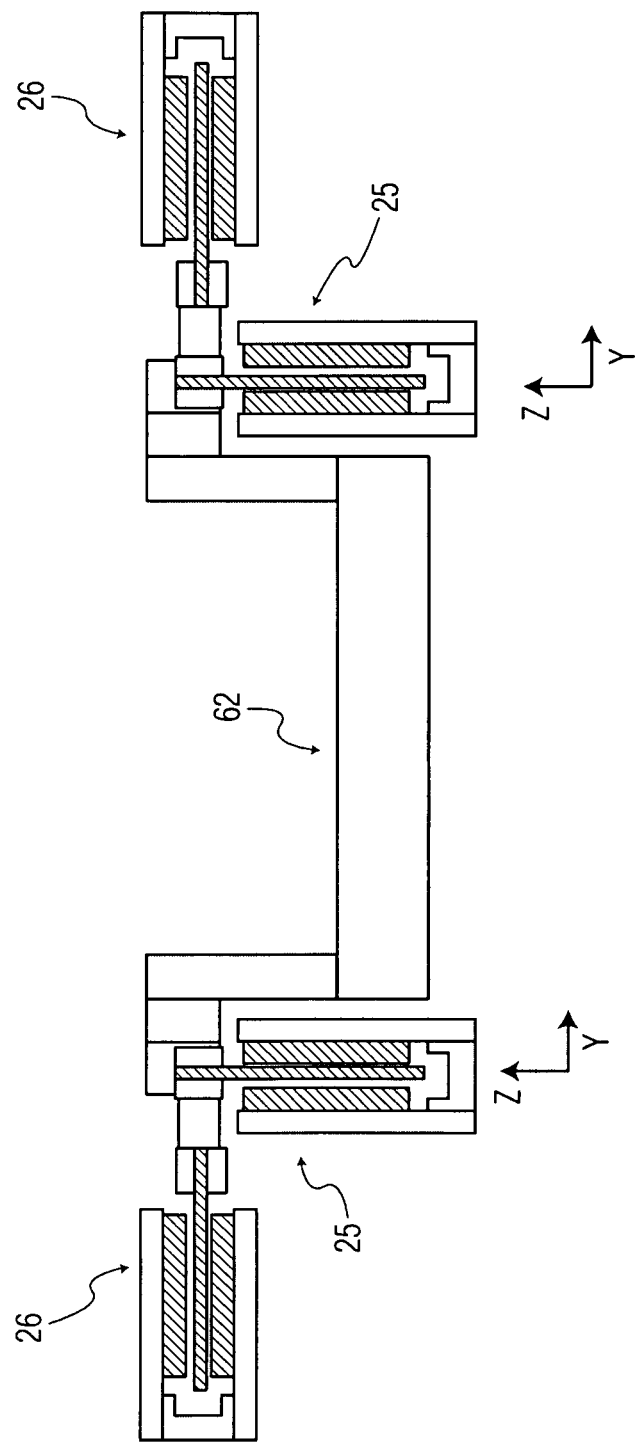
FIG. 23 illustrates a third exemplary mechanical coupling a pair of ironless magnetic linear motor of the present invention to an object.
Figure 24:
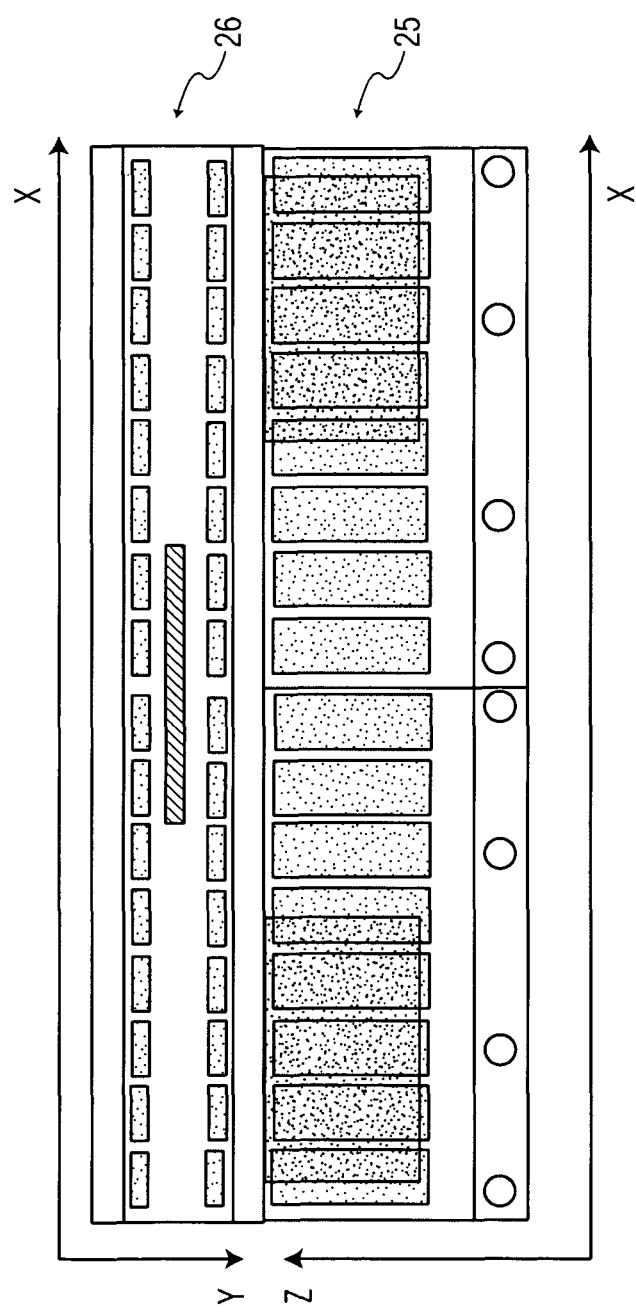
FIG. 24 illustrates a view of a mechanical coupling of a pair of ironless magnetic linear motor of FIG. 23 in a X-Z plane.

Referring to FIGS. 23 and 24, a pair of ironless magnetic linear motors 25 of the present invention is mechanically coupled in an eccentric to opposing sides of an object 62 with each motor 25 having an ironless magnetic linear motor 26 of the present invention being mechanically coupled thereto. Each motor 25 and motor 26 includes a pair of magnetic tracks 30 mechanically coupled to align their respective linear air gaps as an integrated linear air gap. Each motor 25 further includes pair of forces 40 within the integrated linear air gap to selectively generate a drive force $F_X$, a levitation force $F_Z$, a drive torque $R_X$, a levitating torque $R_Y$ and a transversal torque $R_Z$. Each motor 26 further includes a single forcer 40 within the integrated linear air gap to selectively generate a drive force $F_X$, and a transversal force $F_Y$. The result is a six (6) degree of freedom control of object 62 relative to a coordinate system of object 62 with a long stroke of object 62 along the X drive axis of the integrated linear air gaps of motors 24 and short strokes of object 62 along the Z levitating axes and the Y transversal axes of the integrated linear air gaps of motors 24.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

The invention claimed is:

1. An ironless magnetic motor system for moving an object comprising a pair of motors coupled to opposing sides of the object, wherein each motor of the pair of motors comprises:

a magnetic track having an X drive axis and a Z levitation axis, the magnetic track including two rows of magnets linearly arranged along the X drive axis and separated by a linear air gap for generating a magnetic field across the linear air gap;

a forcer including a set of coils disposed within the linear air gap, a coil of the set of coils having two levitating turn parallel to the X drive axis and orthogonal to the levitation axis and two drive turns orthogonal to the X drive axis and parallel to the Z levitation axis, wherein the two drive turns are connected together at opposite ends by the two levitating turns to form the coil; and a commutation current generator for generating a commutation current for moving the force=along the X drive axis and for moving the forcer along the Z levitation axis, wherein the forcer is offset from a center X-Z longitudinal plane of the linear air gap so that the forces is closer to a first row of magnets than to as second row of magnets of the two rows of magnets, and wherein forcers of the pair of motor are offset towards each other.

2. The ironless magnetic motor system of claim 1, further comprising a sensor configured to determine a position of the forcer within the magnetic field.

3. The ironless magnetic motor system of claim 1, further comprising a further pair of motors so that a first side of the object has first and second motors that are perpendicular to each other, and a second side of the object has third and fourth motors that are perpendicular to each other.

4. An ironless magnetic motor system far moving an object comprising pair of motors coupled to opposing sides of the object, wherein each motor of the pair of motors comprises:

a magnetic track having an X drive axis and a Z levitation axis, the magnetic track including two rows of magnets linearly arranged along the X drive axis and separated by a linear air gap for generating a magnetic field across the linear air gap;

a forcer including a set of coils disposed within the linear air gap, a coil of the set of coils having two levitating turns parallel to the X rive axis and orthogonal to the Z levitation axis and two drive turns orthogonal to the X drive axis and parallel to the Z levitation axis, wherein the two drive turns are connected together at opposite ends by the two levitating turns to form the coil; and a commutation current generator for generating a commutation current for moving the forcer along the X drive axis and for moving the forcer along the Z levitation axis, wherein the forcer is offset from a center X-Z longitudinal plane of the linear air gap so that the forces is closer to a first row of magnets than to a second row of magnets of the two rows of magnets, and wherein a first forcer of a first motor of the pair of motors is of away the object and a second forcer of a second motor of the pair of motors is offset towards the object.

5. The ironless magnetic motor system of claim 4, further comprising a sensor configured to determine a position of the forcer within the magnetic field.

6. The ironless magnetic motor system of claim 4, further comprising a further pair of motors so that a first side of the object has first and second motors that are perpendicular to each other, and the second side of the object has third and fourth motors that are perpendicular to each other.

* * * * *